March 1, 1966  R. J. TOMSON  3,237,642
DOUBLE PLUG VALVE
Filed March 9, 1964  3 Sheets-Sheet 1

INVENTOR
RICHARD J. TOMSON
BY
ATTORNEY

March 1, 1966 R. J. TOMSON 3,237,642
DOUBLE PLUG VALVE
Filed March 9, 1964 3 Sheets-Sheet 3

INVENTOR
RICHARD J. TOMSON
BY Carl A. Hechmer
ATTORNEY

United States Patent Office 3,237,642
Patented Mar. 1, 1966

3,237,642
DOUBLE PLUG VALVE
Richard Johann Tomson, Ville St. Laurent, Quebec, Canada, assignor, by mesne assignments, to E. I. du Pont de Nemours and Company, Wilmington, Del., a corporation of Delaware
Filed Mar. 9, 1964, Ser. No. 350,153
3 Claims. (Cl. 137—608)

This application is a continuation-in-part of United States application 61,000 filed October 6, 1960, now abandoned.

This invention relates to a selector valve, more particularly to a jacketed double plug valve which can provide selective shut off for streams of liquid material.

More specifically, the valve of this invention has three ports, A, B and C and is designed for the purpose of directing a stream of a liquid and especially a molten material entering through port A into ports B and C or into ports B or C only and for shutting off B and/or C entirely or directing a flow coming from ports B and/or C into port A.

When a molten thermoplastic polymer is flowing through a heated transfer line to the discharge points on the line it is the present practice to shut off the flow to the line, dismantle and clean the line when additional discharge points are to be added or when points are to be removed. It is also the present practice to use a T in the line when flow is required in two directions simultaneously and to replace this T with an elbow when flow is required in only one direction and as before the transfer line has to be dismantled and cleaned before it can be used again.

In accordance with the invention it is now possible to stop the flow in the line and add or remove discharge points without dismantling the transfer line for clean up. It is also possible to direct the flow of molten polymer in two directions through the two ports of the valve and to stop or resume flow through one port without upsetting the performance of the other port. It is also possible to clean the discharge port which is not in use without upsetting the operation of the other discharge port.

It is therefore an object of the invention to provide an effective valve adapted to direct a stream of a molten material into different ports. Another object is to provide a valve which can be used for positive or negative pressures. Yet another object is to provide a valve having no stagnant areas, spaces or corners where a turbulent or slow velocity flow could occur and eliminating all dead spots, cracks and blind ends where gel could form. A further object is to provide a valve which can be cleaned out while it is in operation. An additional object is to provide a valve which eliminates substantially any leakage. A particular object of the invention is to provide a valve which can store solidified material in it and resume the flow of the material after said material has been thawed without the necessity of cleaning the valve. Still another object is to provide a valve having an adequate heating system.

Still other objects of the invention will be apparent from the following detailed description of the appended drawings which form a part of this invention.

The valve of the present invention comprises a body having opposed end faces with a three legged, Y-shaped passage running parallel to the end faces. The Y-shaped passage connects three ports situated at the extremities of the Y. A pair of frustro-conical plug cocks are rotatably mounted on parallel axes in the body across two of the legs of the Y-shaped passage near the intersection of the legs. The tapers of the cocks are opposed and each is provided in the conventional manner with a passage normal to its axis of rotation, alignable upon rotation with the leg of the passage across which the cock is disposed. Retaining means are provided at each end of each cock to hold each cock in the housing. In addition, means are provided to rotate each cock. The arrangement permits disassembly of one retaining means for each cock for clean up purposes without removal of the cock from operation.

As will be described hereinafter, each cock is further provided with an access passage through the valve body alignable with the cock passage when the cock is in its "clean out" or "closed" position. Another aspect of the invention is the provision of a dimple in each cock, of such size and positioned such, that when the cock is in the "closed" position, the dimple faces the open passage legs in the valve body and provides smooth, uninterrupted flow to liquids passing through these legs.

Figure 1:
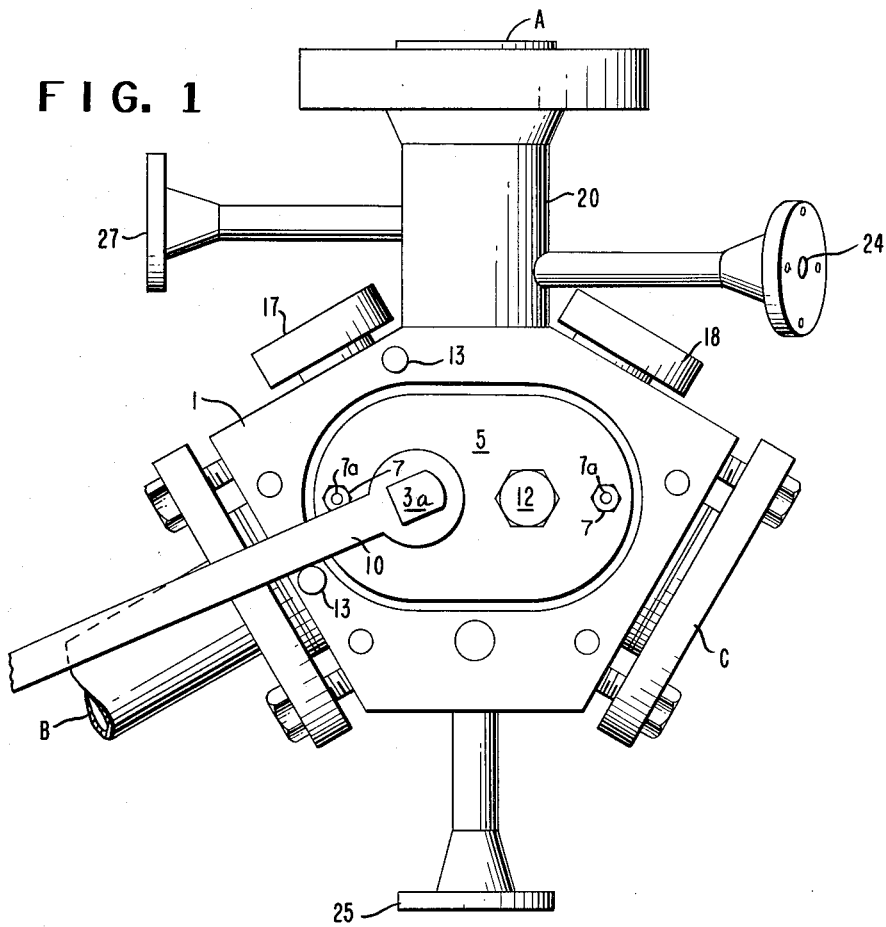
FIGURE 1 is an elevational view of a valve embodying the present invention.
Figure 2:
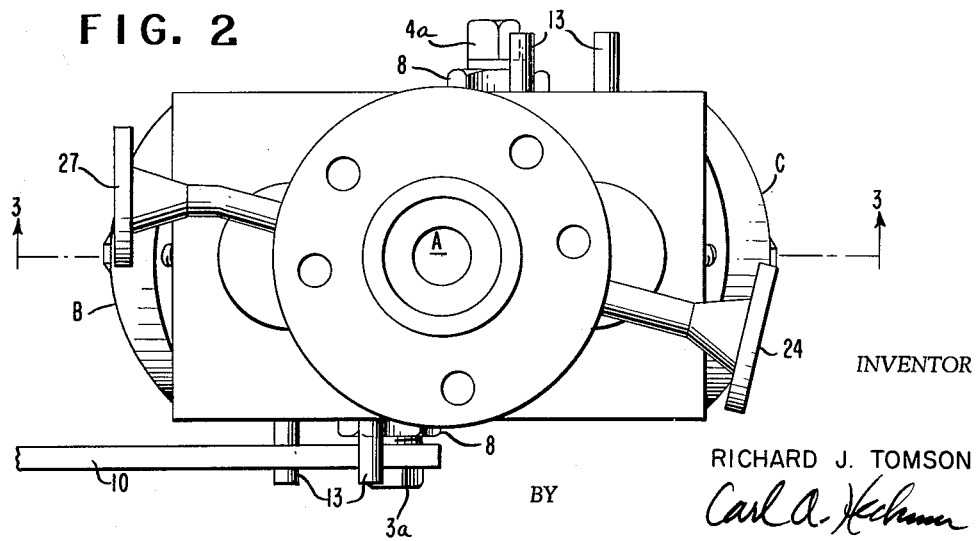
FIGURE 2 is a top plan view of the valve shown in FIGURE 1.

A valve body 1 having opposed end faces contains a Y-shaped passage 2 (FIG. 3) connecting three parts A, B and C. The legs of the passage are parallel to the end faces. Frustro-conical plug cocks 3 and 4 (FIGURES 3 and 4) are rotatably mounted in matching bores in body 1. These bores are on parallel axes with their tapers opposed. Each bore is transverse to a leg of passage 2 near the juncture of the Y and each extends through each end face. Each cock is provided with a passage normal to its axis of rotation and rotatably alignable with passage 2, and with a stem, 3a and 4a (FIGS. 1, 2, 4 and 5) which lies along its rotatable axis extending from that end of the cock that is of smaller area. The outer extremity of each stem is shaped to accommodate a tool 10 (FIGS. 1, 2 and 4) for applying a rotating force to the cock. The cocks are retained within the valve body by means of end plates 5 and 6 (FIGS. 1 and 4), removably mounted to the valve body by means of nuts 7 threaded upon studs 7a which project from the opposed end faces of the valve body (FIGS. 1, 4 and 5). Stems 3a and 4a extend through openings in end plates 5 and 6 respectively and are held in place by means of a nut 8, threaded to each stem (FIGS. 2 and 4), a spacer ring 9 and a gasket 11 (FIG. 4). Seating bolts 12 fit thread openings in each end plate opposite the stemless flat face of each cock and by contact with the said cock tends to seat it in its tapered bore. Stop pins 13 (FIGS. 1, 2 and 4) limit the travel of tool 10 and indicate the "open" position and "clean-out" or "closed" position of each of the cocks. To change the position of a cock, bolt 12 is backed off, and nut 8 is loosened thereby permitting loosening the cock in its bore by taping end 3a gently. The cock is then rotated to the desired position by tool 10, whereupon the cock may be reseated by tightening bolt 12 and nut 8. As is obvious from FIGURE 3, port A can be connected with either or both ports B and C by suitable positioning of cocks 3 and 4.

From a consideration of FIGURE 4, it can be seen that either of end plates 5 and 6 can be removed to permit cleaning while the valve is in operation without affecting the position of either cock. For instance, upon removal of end plate 6, by removal of appropriate nuts 7 and 8 ring 9 and gasket 11, cock 3 is held in its bore by its retaining nut and cock 4 by its seating bolt. If end plate 5 is removed, with end plate 6 in position, cock 3 is held in its bore by its bolt and cock 4 by its retaining nut. Thus each of the opposed ends of the valve body and each extremity of each cock can be cleaned by alternate removal and replacement of the end plates.

Figure 3:
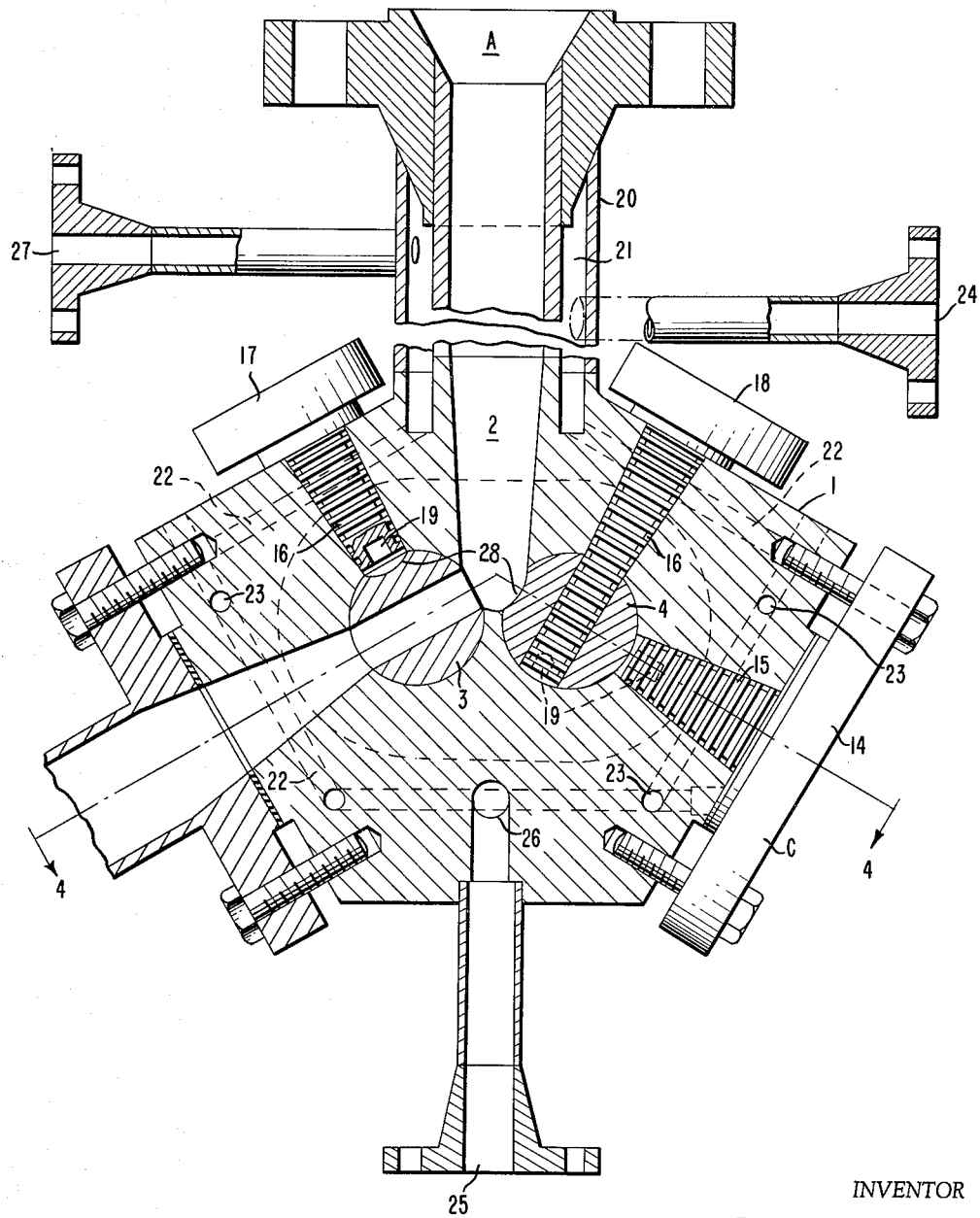
FIGURE 3 is a cross-sectional side elevation view along line 3—3 of FIGURE 2, with some parts broken away.
Figure 4:
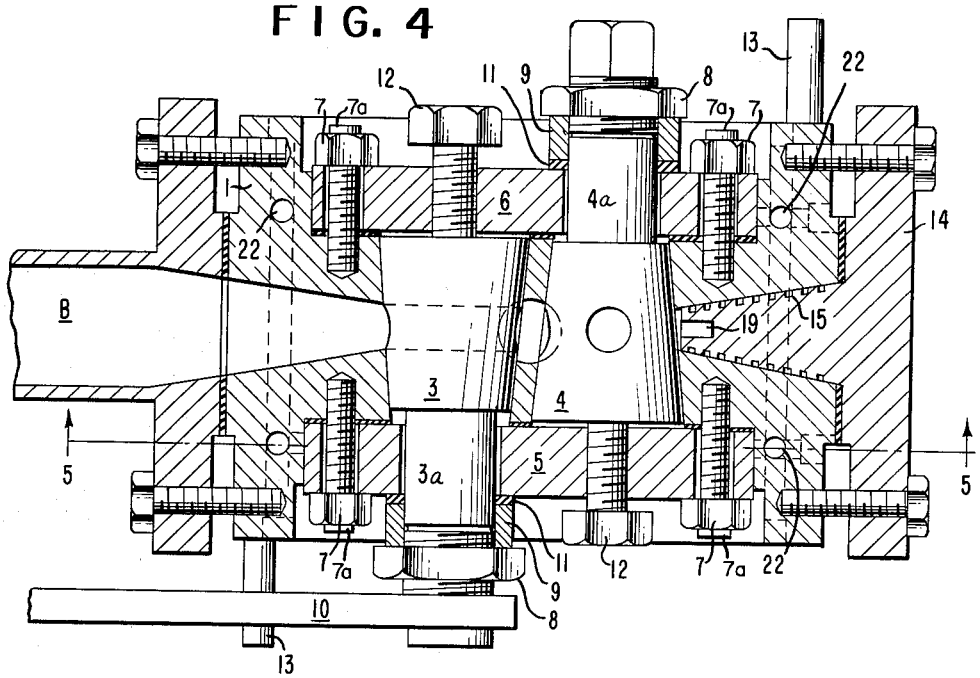
FIGURE 4 is a cross-sectional view along line 4—4 of FIGURE 3.
Figure 5:
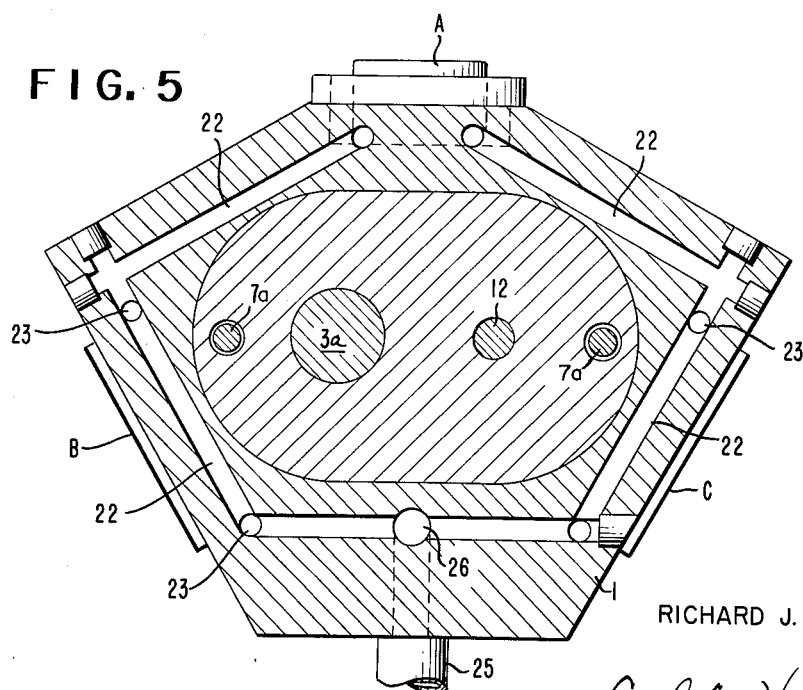
FIGURE 5 is a cross-sectional view along line 5—5 of FIGURE 4 illustrating the heating system of the valve of the present invention.

When not in use, either of ports B or C may be closed by means of flanged plug 14 bolted to the valve body as shown in FIGURES 3 and 4 at port C, the said plug having a body portion extending into the leg of closed Y passage. Peripheral serrations 15 along the body portion of the plug can be provided to assist in removal of material adhering to the walls of the closed leg of the Y passage.

Means is provided for cleaning the passage through each cock without removal of the cock from the valve body through an access hole 16 drilled in the valve body in a position coaxial to the cock passage when situated in a "closed" position. Normally each access hole is stoppered with a friction fitted plug 17 (FIGS. 1 and 3) whose peripherally serrated body extends within the hole, the serrations tending to collect and remove material which may be present within the hole. To clean the passage of a cock, the cock is rotated using tool 10 to its closed position so that the cock passage is aligned with the access hole. Access hole plug 17 is then replaced with a clean out plug 18 (FIGS. 1 and 4), the body of the clean out plug being of sufficient length and having a cylindrical tip to extend into the aligned cock passage. The body of clean out plug 18 is peripherally serrated to assist in removal of waste material. Furthermore, the tips of each of plugs 14, 17 and 18 are advantageously countersunk to provide a cavity 19 (FIGS. 3 and 4) into which material to be removed will pack upon insertion of the plug.

In its preferred embodiment the valve of the present invention is provided with heating means so that it may accommodate heated or molten materials, such as thermoplastic resins. Conveniently this is provided by means of jacket 20 (FIGS. 1 and 3) forming a chamber 21 (FIG. 3) around an extension of the arm of the Y-shaped passage, across which no cock is disposed, i.e., the passage terminating in port A, into which chamber a heat carrying fluid such as superheated steam can be introduced. The chamber is connected to two longitudinal conduits 22 (FIGS. 3, 4 and 5) in valve body 1 which carry the heating medium around the area of the body enclosing Y passage 2. A series of lateral conduits 23 (FIGS. 1, 3 and 5) connect the two longitudinal conduits to improve heat transfer throughout the body of the valve. The heating medium is introduced at inlet 24 (FIGS. 1, 2 and 3) and is removed at outlet port 25 (FIGS. 1, 2, 3 and 5) after flowing into collector conduit 26 (FIGS. 1, 3 and 5). A gas vent is provided at 27 (FIGS. 1, 2 and 3) for use when the heating medium is liquid.

Although not essential it has been found advantageous to put a dimple 28 (FIG. 3) in the periphery of cocks 3 and 4 to provide a smooth flow pattern to liquid passing through two legs of the Y passage when one of them is closed.

The valve of the invention can be employed with any liquid or molten material. If the valve is used in connection with molten polymers or plastics, the valve may be heated either by hot liquid circulating in the heating network of conduits by steam, hot gas or even by electricity. If the valve body is to be heated by electricity, the electric heating elements are inserted into the heating network of conduits.

It is to be noted that there are no packing glands of any type and the plug cocks are held in place by side plates. Gaskets are provided simply to prevent hardened material from binding the different parts together. Under normal circumstances, the two plug cocks will not leak. However, after long use or misuse should leakage occur, clean up is simply as has been illustrated.

The plug cocks do not require lubrication at any temperature and pressure range for which the valve is designed. However, the material of construction of the plug cocks may advantageously be of self-lubricating characteristics in relation to the inner periphery of the plug casing material.

Ports B and C can be chosen as inlet ports, using port A as an outlet port, thereby joining two streams into one in any desired amount. Furthermore port B can be chosen as inlet and ports A and C as outlets and vice versa.

It will, of course, be understood that many details of construction may be varied through a wide range without departing from the principles of the invention and it is therefore not the purpose to limit the patent granted hereon otherwise than necessitated by the scope of the appended claims.

What is claimed is:

1. A valve comprising a body having opposed end faces with a three legged, Y-shaped passage running parallel to the said end faces, the said Y-shaped passage connecting three ports situated at the extremities of the said passage, a pair of frusto-conical plug cocks, each of the said cocks being provided with a stem centered upon, fixed to, and extending from the end of smaller area of the said cock and the said cocks being rotatably mounted on parallel axes in the said body in matching frusto-conical bores terminating at opposite faces of said opposed end faces and disposed across two of the legs of the said Y-shaped passage adjacent to the intersection of the said legs, the tapers of the said matching pairs of bores and cocks being opposed and each said cock containing a flow-through passage normal to its axis of rotation, alignable upon rotation with the leg of the said Y-shaped passage across which the said cock is disposed, a removable plate at each end face of said body disposed to cover each terminus of said frusto-conical bores and each said plate being bored to accommodate a rotatable protrusion of said stem from said body, and removable locking means to retain said stem and said plate in a fixed relation.

2. The valve of claim 1 wherein each said plug cock is dimpled, the said dimple being rotatably alignable with the two legs of the said Y-shaped passage adjacent to the leg across which the said cock is disposed, the said dimple providing a smooth flow pattern to liquid passing through the said two adjacent legs.

3. A valve body having opposed end faces, and housing a three legged, Y-shaped passage running parallel to the said end faces, the said passage connecting ports at each of its extremities, a pair of frusto-conical plug cocks, each of the said cocks being provided with a stem centered upon, fixed to, and extending from the end of smaller area of the said cock and the said cocks being rotatably mounted on parallel axes in the caid body in matching frusto-conical bores terminating at opposite faces of said opposed end faces and disposed across two of the legs of the said Y-shaped passage, the tapers of the said matching pairs of bores and cocks being opposed and each said cock being provided with a passage normal to its axis of rotation and rotatably alignable with the leg of the said Y-shaped passage across which the said cock is disposed, and rotatably alignable with an access hole through the said body when the passage of the said cock is in non-alignment with the passage of the leg of the said Y-shaped passage across which the said cock is disposed, a removable plate at each end face of said body disposed to cover each terminus of said frusto-conical bores and each said plate being bored to accommodate a rotatable protrusion of said stem from said body, and removable locking means to retain said stem and said plate in a fixed relation.

(References on following page)

References Cited by the Examiner

UNITED STATES PATENTS

| | | | |
|---|---|---|---|
| 860,217 | 7/1907 | Jackson | 251—188 X |
| 1,534,406 | 4/1925 | Martocello | 137—608 |
| 1,535,212 | 4/1925 | Egloff et al. | 251—183 X |
| 1,646,013 | 10/1927 | Cornell | 137—340 X |
| 1,810,331 | 6/1931 | Wilhjelm | 137—584 |
| 2,110,557 | 3/1938 | Seifer | 137—606 X |
| 2,650,611 | 9/1953 | Henderson | 137—606 X |
| 2,857,130 | 10/1958 | Brisbane | 251—309 X |
| 2,975,983 | 3/1961 | Niebling | 137—608 X |
| 2,997,056 | 8/1961 | Massey | 137—594 X |
| 3,111,299 | 11/1963 | Miller et al. | 251—309 X |

FOREIGN PATENTS

| | | |
|---|---|---|
| 591,759 | 4/1925 | France. |
| 837,426 | 4/1952 | Germany. |
| 18,077 | 1914 | Great Britain. |

M. CARY NELSON, *Primary Examiner.*

LAVERNE D. GEIGER, *Examiner.*